US010400948B2

(12) United States Patent
Yilmaz et al.

(10) Patent No.: US 10,400,948 B2
(45) Date of Patent: Sep. 3, 2019

(54) APPARATUS FOR REGULATING AT LEAST ONE FLUID FLOW IN A VEHICLE

(71) Applicant: Robert Bosch GmbH, Stuttgart (DE)

(72) Inventors: Fatih Yilmaz, Norderstedt (DE); Bernd Hein, Baiersbronn/Schoenmuenzach (DE); Jerome Thiery, Strasbourg (FR)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 15/604,969

(22) Filed: May 25, 2017

(65) Prior Publication Data

US 2017/0343153 A1 Nov. 30, 2017

(30) Foreign Application Priority Data

May 27, 2016 (DE) ........................ 10 2016 209 204

(51) Int. Cl.

| | |
|---|---|
| ***F16M 13/02*** | (2006.01) |
| ***F16B 21/06*** | (2006.01) |
| ***B60K 1/00*** | (2006.01) |
| ***B60K 11/02*** | (2006.01) |
| ***F04D 13/14*** | (2006.01) |
| ***F04D 29/60*** | (2006.01) |
| *F01P 5/10* | (2006.01) |

(52) U.S. Cl.

CPC ............... *F16M 13/02* (2013.01); *B60K 1/00* (2013.01); *B60K 11/02* (2013.01); *F04D 13/14* (2013.01); *F04D 29/605* (2013.01); *F16B 21/06* (2013.01); *B60K 2001/006* (2013.01); *B60Y 2304/05* (2013.01); *B60Y 2410/113* (2013.01); *F01P 5/10* (2013.01)

(58) Field of Classification Search

USPC .................................................... 248/220.22

See application file for complete search history.

(56) References Cited

U.S. PATENT DOCUMENTS

| | | | | |
|---|---|---|---|---|
| 2,302,668 A * | 11/1942 | Banneyer | F16L 3/222 | 248/68.1 |
| 4,306,697 A * | 12/1981 | Mathews | F16L 3/222 | 248/68.1 |
| 6,595,185 B2 * | 7/2003 | Michels | F02D 9/10 | 123/337 |

(Continued)

FOREIGN PATENT DOCUMENTS

| | | |
|---|---|---|
| DE | 102014208395 A1 | 11/2015 |
| DE | 102014224978 A1 | 6/2016 |

(Continued)

*Primary Examiner* — Monica E Millner

(74) *Attorney, Agent, or Firm* — Michael Best & Friedrich LLP

(57) ABSTRACT

An apparatus (1) for regulating at least one fluid flow in a vehicle (5), having a first fluid regulation unit (20), in particular a pump or a valve, for regulating a first fluid flow, and a first holder (20) with a receiving region (22) for the first fluid regulation unit (10) and with a first fastening means (28), wherein the first fluid regulation unit (10) is arranged in the receiving region (22) of the first holder (20), and wherein the first fastening means (28) is provided for fastening the holder (20) to the vehicle (5). The first holder (20) has at least one connecting means (26) for connecting the first holder (20) to a second holder (70).

20 Claims, 10 Drawing Sheets

(56) References Cited

U.S. PATENT DOCUMENTS

| | | | | |
|---|---|---|---|---|
| 8,882,053 | B2 * | 11/2014 | Chirpich | F16L 3/1075 248/68.1 |
| 2004/0086331 | A1 | 5/2004 | Iwamoto | |
| 2007/0257157 | A1 * | 11/2007 | Lu | F16L 3/221 248/68.1 |
| 2012/0007456 | A1 * | 1/2012 | Hein | F16J 15/062 310/89 |
| 2012/0118401 | A1 | 5/2012 | Murabayashi et al. | |
| 2014/0299735 | A1 * | 10/2014 | Hein | F16F 1/371 248/562 |
| 2016/0016463 | A1 | 1/2016 | Kimura et al. | |
| 2017/0217380 | A1 * | 8/2017 | Mahfoudh | B60R 11/00 |
| 2018/0162211 | A1 * | 6/2018 | Kim | B60K 5/1208 |

FOREIGN PATENT DOCUMENTS

| | | | |
|---|---|---|---|
| WO | 2014120260 | A1 | 8/2014 |
| WO | 2015145336 | A1 | 10/2015 |

* cited by examiner

APPARATUS FOR REGULATING AT LEAST ONE FLUID FLOW IN A VEHICLE

BACKGROUND OF THE INVENTION

The invention relates to an apparatus for regulating at least one fluid flow in a vehicle.

An apparatus for regulating a fluid flow is already known. The known apparatus comprises a pump which is attached by means of a holder and a mounting device to a motor vehicle. The holder connects the pump to a mounting device. A first end of the mounting device is inserted into a recess of the holder. The second end, which is situated opposite the first end, of the mounting device has bores which allow the mounting device to be screwed on and thus allow the apparatus to be connected to a vehicle. A disadvantage of such a construction is the large space requirement, in particular in the case of more than one pump being used.

SUMMARY OF THE INVENTION

The apparatus according to the invention has the advantage that, owing to the formation of a connecting means on a holder, an inexpensive and simple facility is provided for connecting the holder to further holders. It is also advantageous that the manufacturing process is simplified, and thus production costs are reduced. A further advantage is that the holder and the fluid regulation units can be subsequently retrofitted.

It is particularly advantageous that the apparatus has at least one second holder with a second fluid regulation unit, in particular for regulating a second fluid flow. The second fluid regulation unit is arranged in a receiving region of the second holder. The second holder has at least one connecting means. It is particularly advantageous that the second holder is connected by the second connecting means to the first holder. In this way, it is possible to form a space-saving apparatus with multiple fluid regulation units. It is also advantageous that the fluid regulation units are better decoupled, in particular decoupled in terms of vibrations, from one another. Also, relative movements of the fluid regulation units with respect to known individually arranged fluid regulation units are minimized.

It is advantageous that the holders have at least two connecting means which connect the holders to one another. It is preferably possible for any desired number of connecting means which connect the holders to be formed. The stability and decoupling or damping are improved.

It is advantageous that at least one connecting means of the first holder and at least one connecting means of the second holder form a plug-action or snap-action connection. The mounting direction of the plug-action connection or of the snap-action connection is translational or radial. A plug-action connection or snap-action connection makes it possible to realize an easily producible connection between two holders.

It is considered to be advantageous that at least one of the connecting means of the first holder has a fastening cutout, in particular with an undercut, or is in the form of a fastening lug. It is also advantageous that at least one of the connecting means of the second holder has a fastening cutout, in particular with an undercut, or is in the form of a fastening lug. A fastening lug and a fastening cutout which are formed so as to correspond with one another constitute an easily producible connecting means. Also, a positive fastening lug and a negative fastening cutout can be easily connected to one another.

It is advantageous that at least one fastening lug is of substantially cylindrical form. The diameter of the fastening lug preferably increases. In particular, at least one fastening lug has a cylindrical section and a frustoconical section, wherein the cylindrical section and the frustoconical section transition into one another. In particular, the cylindrical and frustoconical sections are formed in one piece.

It is particularly advantageous that the longitudinal axis of the fastening lug runs radially relative to the holder. The mounting process is simplified in this way.

It is advantageous that the fastening lug has an in particular continuous bore. An element can be inserted into the bore, whereby the fastening lug expands radially. In particular, the expansion gives rise to an increase in the friction coefficient between the connecting elements connected to one another.

It is advantageous that the fastening cutout is formed so as to correspond with a fastening lug, wherein in particular, the fastening cutout has an in particular continuous groove running in a longitudinal direction of the fastening cutout. Such an embodiment simplifies the connection of the connecting means. Also, in this way, the force with which the fastening cutout acts on the fastening lug can be regulated.

It is advantageous that the first holder and/or the second holder have/has an in particular ring-shaped main body. The main body surrounds the receiving region, wherein the first holder and/or the second holder act(s) with an in particular uniform radial pressure on the fluid regulation units. The ring-shaped main body permits an optimum force distribution of the radial pressure.

It is advantageous that the fastening lug is, along its longitudinal axis, connected by means of a web to the main body of the holder. The web constitutes an inexpensive and simple means for connecting the fastening lug to the main body. At the same time, the web also constitutes a stable solution.

It is considered to be advantageous that at least one of the connecting elements is formed radially at the outside on at least one of the holders. Such an embodiment permits easy connection of the connecting elements.

It is advantageous that at least one of the holders has an elastomer or is composed partially, in particular entirely, of an elastomer. The elastomer permits decoupling in terms of vibrations between the fluid regulation device and the mounting device or, indirectly, the vehicle.

It is advantageous that the apparatus has a mounting device. The mounting device serves in particular for fastening the first holder and the second holder to a vehicle. The mounting device connects the fastening means at least of the first holder and of the second holder. It is advantageous that preassembly is possible. The decoupling or damping and/or the stability between the two holders is improved.

It is advantageous that the apparatus has three or more holders, wherein at least one holder has at least one further connecting element for connecting to two or more holders. It is advantageous that, in this way, the space requirement can be further reduced.

BRIEF DESCRIPTION OF THE DRAWINGS

The invention will be described in more detail below on the basis of exemplary embodiments. In the figures.

DETAILED DESCRIPTION

Figure 1:
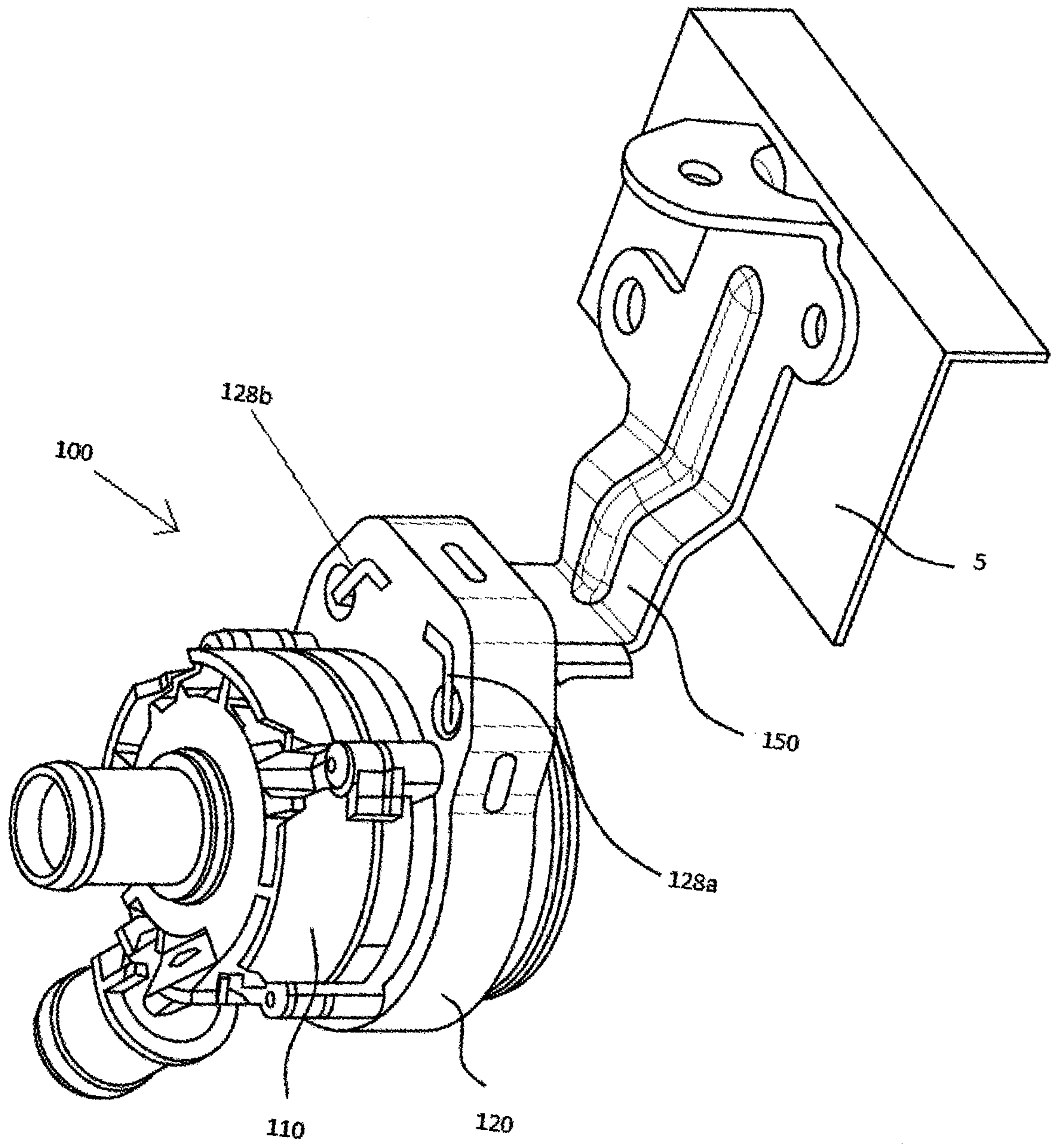
FIG. 1 shows a known attachment of a single pump to a vehicle by means of a single holder and a single mounting device.

FIG. 1 shows a known apparatus 100 comprising a pump 110, which is attached to a motor vehicle 5 by means of a known holder 120 and a mounting device 150. Here, to simplify the illustration, the motor vehicle 5 is shown merely as an angled body part 5. The holder 120 is of substantially ring-shaped form and has a receiving region. The pump 110 is situated in said receiving region. The holder 120 has two recesses 128*a* and 128*b*. The recesses 128*a* and 128*b* allow the holder 120 to be connected to the mounting device 150. The mounting device 150 is in the form of a punched and bent metal plate. A first end of the mounting device 150 is inserted into the recess 128 of the holder 120. The second end, which is situated opposite the first end, of the mounting device 150 has bores which allow the mounting device 150 to be screwed to the vehicle 5.

Figure 2:
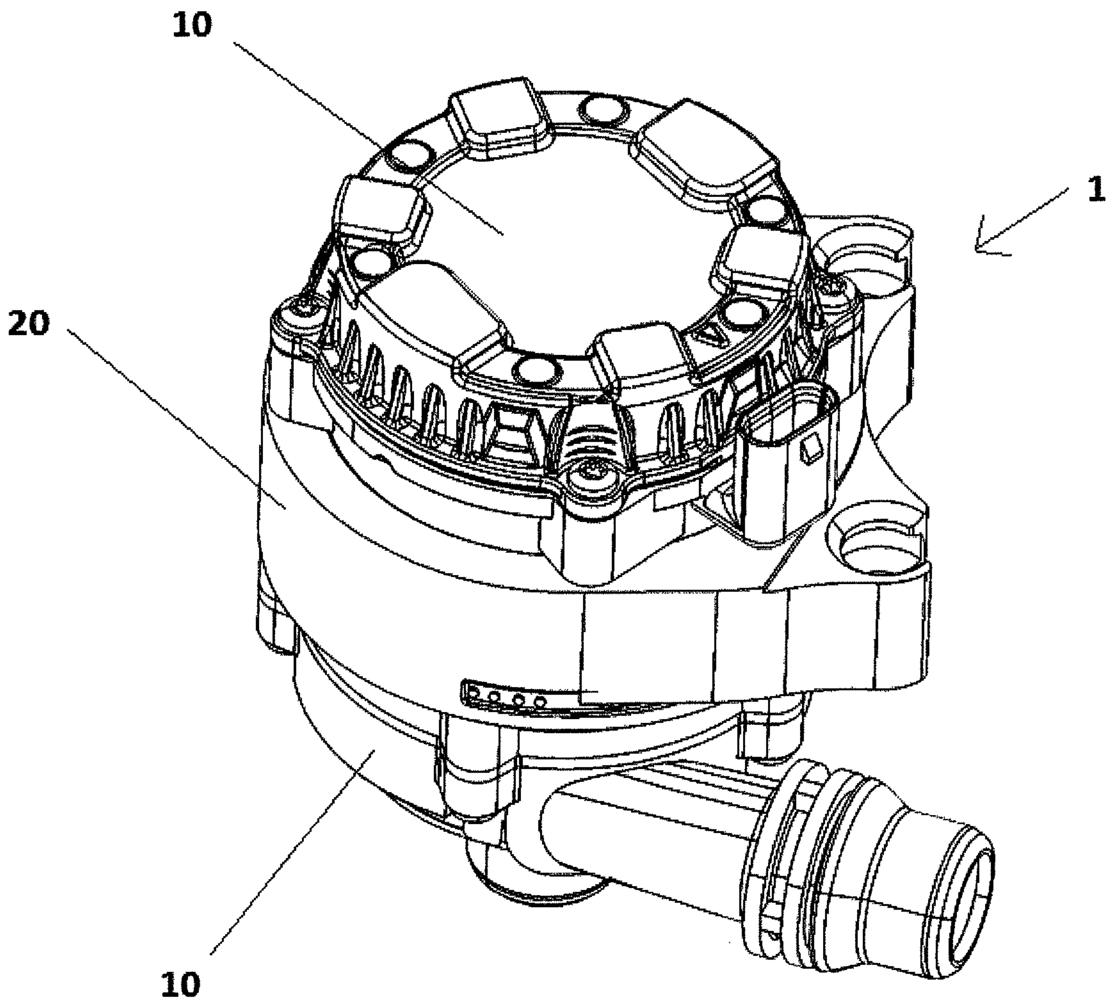
FIG. 2 shows an apparatus according to the invention with a fastening cutout.

FIG. 2 illustrates a first exemplary embodiment of an apparatus 1 according to the invention. The apparatus 1 serves for regulating at least a first fluid flow in/of a vehicle 5. The apparatus 1 has a first fluid regulation unit 10 and a first holder 20.

Figure 3:
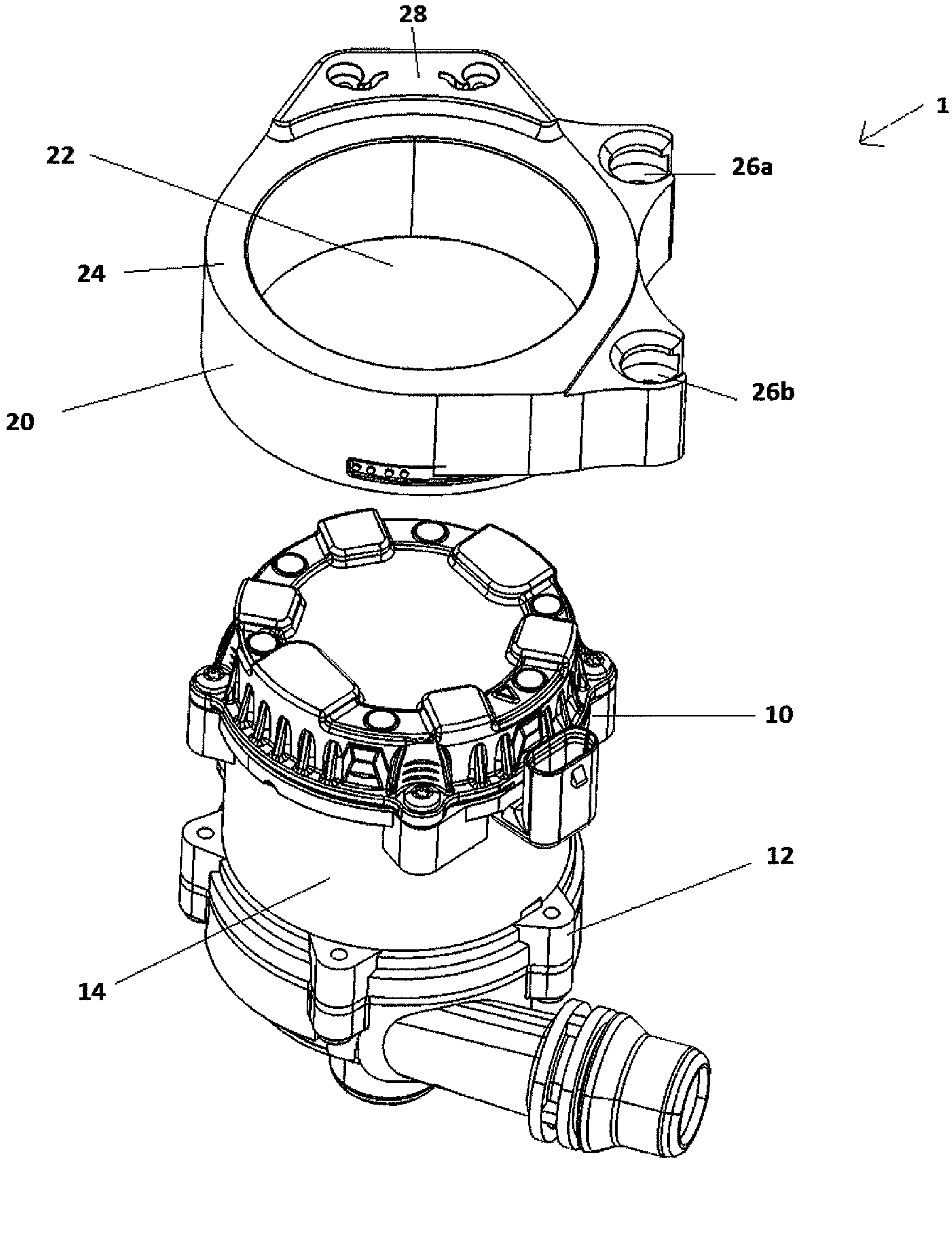
FIG. 3 is an exploded illustration of the apparatus according to the invention as per FIG. 2.

In FIG. 3, the apparatus 1 shown in FIG. 2 is illustrated in an exploded drawing. The first holder 20 is illustrated in the upper region of FIG. 3. The fluid regulation unit 10 is illustrated in the lower region of FIG. 3. By way of example, the fluid regulation unit 10 in FIG. 3 and in FIG. 2 is in the form of a pump, in particular water pump.

The first holder 20 has a receiving region 22. The receiving region 22 is designed such that the fluid regulation unit 10 can be received in the receiving region. The fluid regulation unit 10 has a holder connecting region 14 which corresponds to the receiving region 22 of the first holder 20. The fluid regulation unit 10 and the first holder 20 are connected to one another by means of the receiving region 22 of the first holder 20 and the connecting region 14 of the fluid regulation unit 10. The receiving region 22 and the holder connecting region 14 are designed so as to correspond with one another. In FIG. 2, the holder connecting region 14 is, by way of example, of cylindrical form. In a refinement of the invention, it is however also possible for the holder connecting region 14 to be configured in a rectangular, elliptical or other form, in particular a combination of a rectangular and a round body. It is merely necessary to ensure that the receiving region 22 of the first holder 20 is designed so as to correspond with the holder connecting region 14 of the first fluid regulation unit 10. In FIG. 2, the receiving region 22 of the first holder 20 is, by way of example, of cylindrical form. The receiving region 22 is in particular in the form of a cylindrical recess which runs in particular in continuous fashion through the first holder 20. The shape of the receiving region 22 of the holder 20 is adapted to the shape of the housing 12, in particular of the holder connecting region 14 of the fluid regulation unit 10. To realize the best possible fixing, that is to say a prevention of movement of the fluid regulation unit 10 relative to the holder 20, the inner diameter of the receiving region 22, in particular in the case of a circular or cylindrical design, is smaller than the outer diameter of the fluid regulation unit 10. In the mounted state, the holder 20 acts with a radial pressure on the fluid regulation unit 10. For the mounting process, the first holder 20 is stretched open, the fluid regulation unit 10 is inserted into the receiving region, and the stretching-open action is eliminated.

The first holder 20 has a substantially ring-shaped main body 24. "Substantially" means in particular that the basic shape of the first holder 20 and thus the shape of the main body 24 is of ring-like form. The basic shape is preferably formed in a manner dependent on the receiving region. By way of example, two connecting means 26*a* and 26*b* are arranged radially at the outside on the holder 20. In particular, the connecting elements point to the right in FIG. 3. The two connecting elements 26*a* and 26*b* point in the same direction. The connecting elements 26 are preferably oriented such that a connection to a second holder 70 can be produced. In one refinement of the invention, the connecting elements 26 may also point in different directions. In particular, in this way, it is possible for multiple holders to be connected to the first holder 20, correspondingly to the number of connecting elements 26. The connecting elements 26*a* and 26*b* are spaced apart from one another in a circumferential direction. The connecting elements 26*a* and 26*b* are formed on the outer circumference of the holder 20. The connecting elements 26*a* and 26*b* have a fastening cutout or a fastening lug, or are formed as such. By way of example, in FIGS. 2 and 3, the connecting means have a fastening cutout. The connecting means 26*a* and 26*b* may however also be formed as a fastening lug. It is also possible for one of the connecting means to have a fastening cutout and one of the connecting means to be formed as a fastening lug (see FIG. 4). The connecting elements 26*a* and 26*b* formed as fastening cutout have an at least partially cylindrical recess. In one refinement of the invention, the recess is composed of a cylindrical recess and of a frustoconical recess. The fastening cutouts have, in particular, an undercut.

Furthermore, the holder 20 has a fastening means 28. The fastening means 28 is arranged radially at the outside on the holder 20. The fastening means 28 is formed such that at least indirect fastening of the apparatus 1 to the vehicle 5 is possible. The fastening means 28 is provided at least indirectly for fastening to the vehicle 5. The fastening means 28 has, as per FIG. 3, recesses which are in particular designed such that a mounting device 50 can be connected to the holder 20. The mounting device 50 and the fastening means 28 are in this case in particular in the form of a plug-action connection, detent connection, hook-action connection, screw connection or snap-action connection. The fastening means 28 and the holder 20 are in particular formed in one piece.

Figure 4:
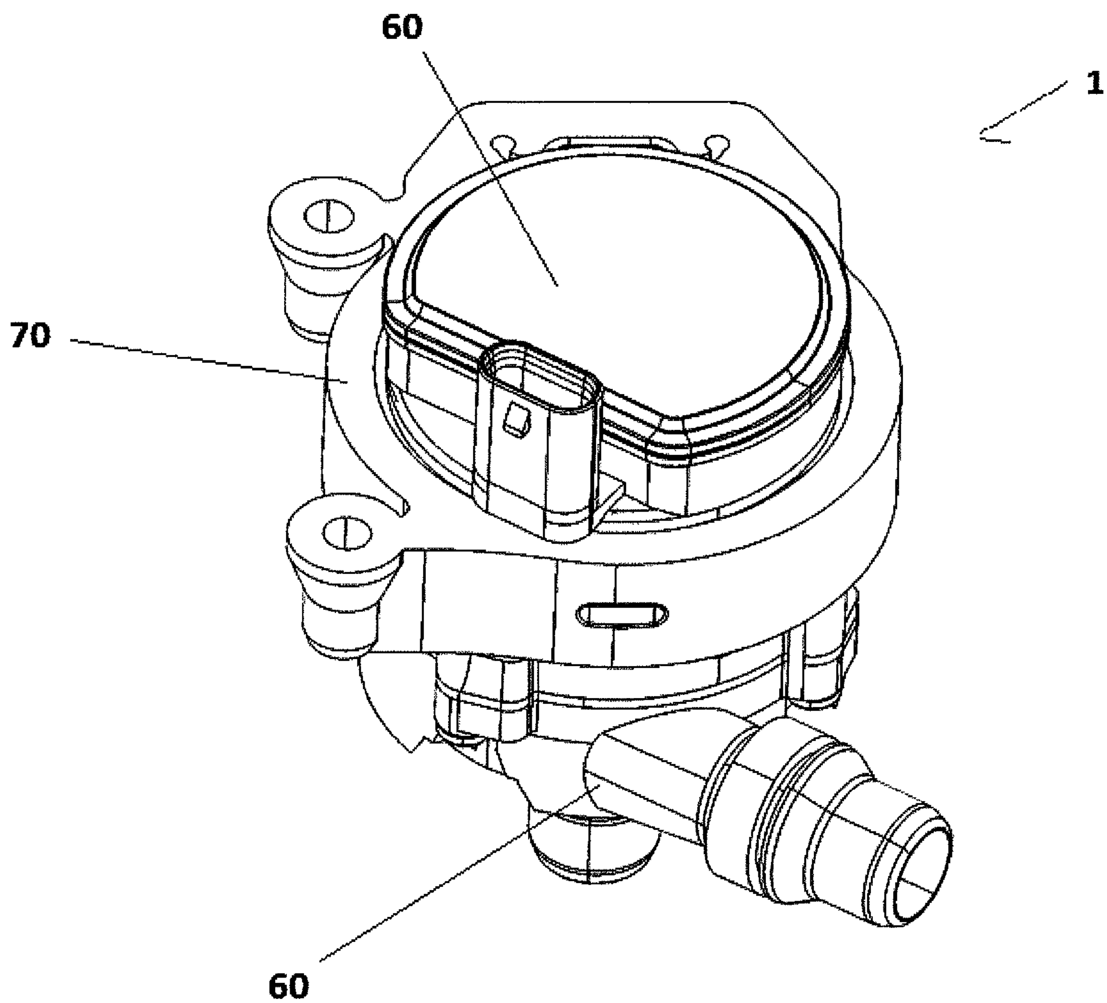
FIG. 4 shows an apparatus according to the invention with a fastening lug.
Figure 5:
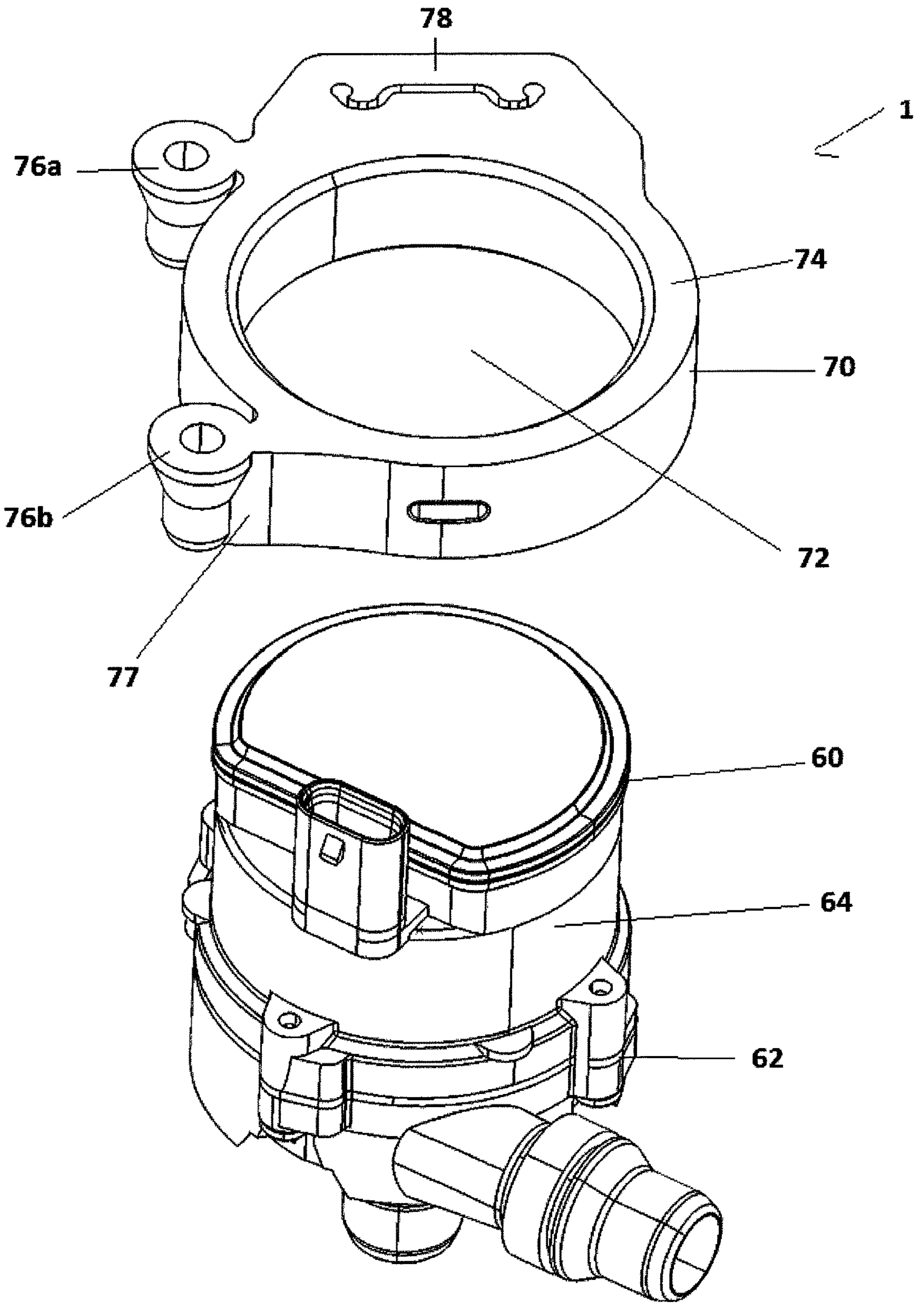
FIG. 5 is an exploded illustration of the apparatus according to the invention as per FIG. 4.

FIG. 4 and FIG. 5 illustrate a second holder 70 with a second fluid regulation unit 60. The second holder 70 is formed so as to correspond with the first holder 20. The second holder 70 also has a receiving region 72 for receiving a second fluid regulation unit 60. Furthermore, the second holder 70 likewise comprises a main body 74, which is of substantially cylindrical form. The fastening means 78 also serves for attaching or fastening the second holder 70 to a motor vehicle 5 or to a part of a vehicle 5. The function and embodiment of the second holder 70 and of the receiving region 72, of the main body 74 and of the fastening means 78 of the second holder 70 are identical to those of the first holder 20, of the receiving region 22, of the main body 24 and of the fastening means 28 of the first holder 20. The functioning and/or construction of the second holder 70 corresponds to that of the first holder 20. Only the connecting elements 26*a*, 26*b* and 76*a*, 76*b* differ, because these are constructed so as to correspond with one another, in particular for producing a connection, in particular a plug-action connection.

The second holder 70 has two connecting means 76*a*, 76*b*. The connecting means 76*a* and 76*b* of the second holder 70 point in the same direction. The connecting means 76*a* and 76*b* are formed on the outer circumference of the main body 74 of the second holder 70. The connecting means 76*a* and 76*b* are in the form of fastening lugs. The fastening lugs are of substantially cylindrical form. The diameter of the fastening lugs increases in a longitudinal direction of the holder 70, in particular oppositely to the mounting direction 40. The fastening lugs have a cylindrical section and a frustoconical section. The cylindrical section and the frustoconical section transition into one another and are formed in one piece. A recess is formed in the conical section. The recess preferably runs in continuous fashion, in particular in the longitudinal direction of the fastening lug, through the entire fastening lug 76*a* or 76*b* respectively. The fastening lug, or the cylindrical and/or frustoconical sections, are connected by means of a web to the outer circumference of the main body 74 of the holder 70. Here, the web runs over the entire height of the holder 70. After a connection between a fastening lug and a fastening cutout has been produced, the web 77 runs within the groove of the fastening cutout.

The connecting elements 26 of the first holder 20 are preferably formed so as to correspond with the connecting means 76 of the second holder 70. The first holder 20 may have connecting means 26 formed as fastening lugs, and likewise, the second holder 70 may have connecting means with fastening cutouts. This makes it possible for the first holder 20 to be connected to the second holder 70, in particular for the holders 20, 70 to be fastened to one another. The mounting direction 40 in which the first holder 20 and the second holder 70 are connected to one another by the connecting means 26 and 76 runs in particular in the longitudinal direction of the first holder 20, or in the longitudinal direction of the first fluid regulation unit 10, and in the longitudinal direction of the second holder 70, or in the longitudinal direction of the second fluid regulation unit 60.

Figure 6:
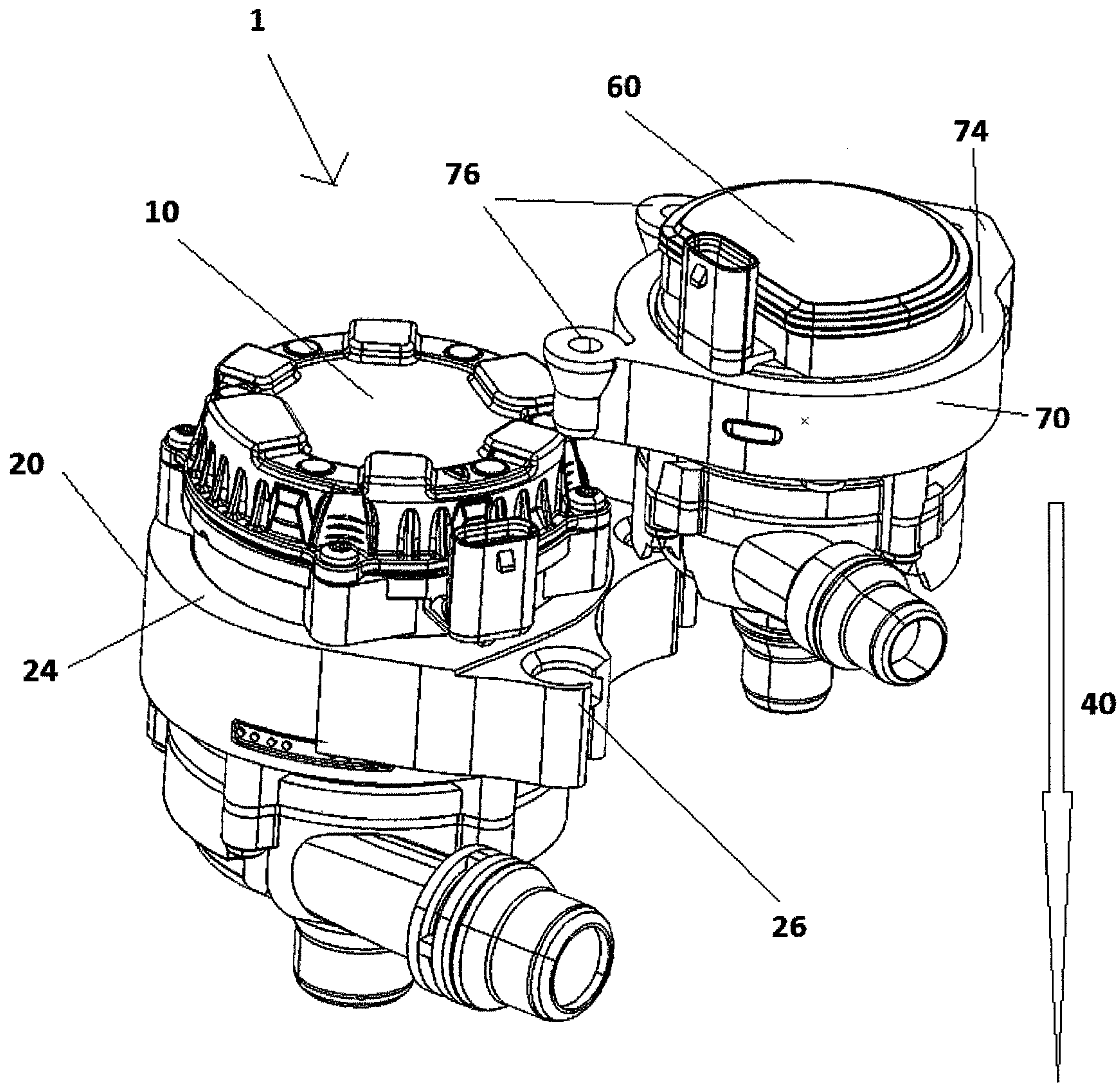
FIG. 6 is an illustration showing the mounting direction.

In FIG. 6, the fluid regulation units 10, 60 are arranged in the receiving regions of the first holder 20 and of the second holder 70. The connecting elements 26 are aligned with respect to the connecting elements 76 and are guided into one another correspondingly to the mounting direction 40. The connecting elements 76, that is to say the fastening lugs 76, are preferably inserted into the connecting elements 26, that is to say the fastening cutouts. The connecting elements or the fastening cutout and the fastening lug thus constitute a plug-action connection.

In one refinement of the invention, the connecting elements 26, 76 are embodied not as a plug-action connection but as a snap-action connection, hook-action connection or screw connection. In particular, the holders may also have two or more different connecting elements.

Figure 7:
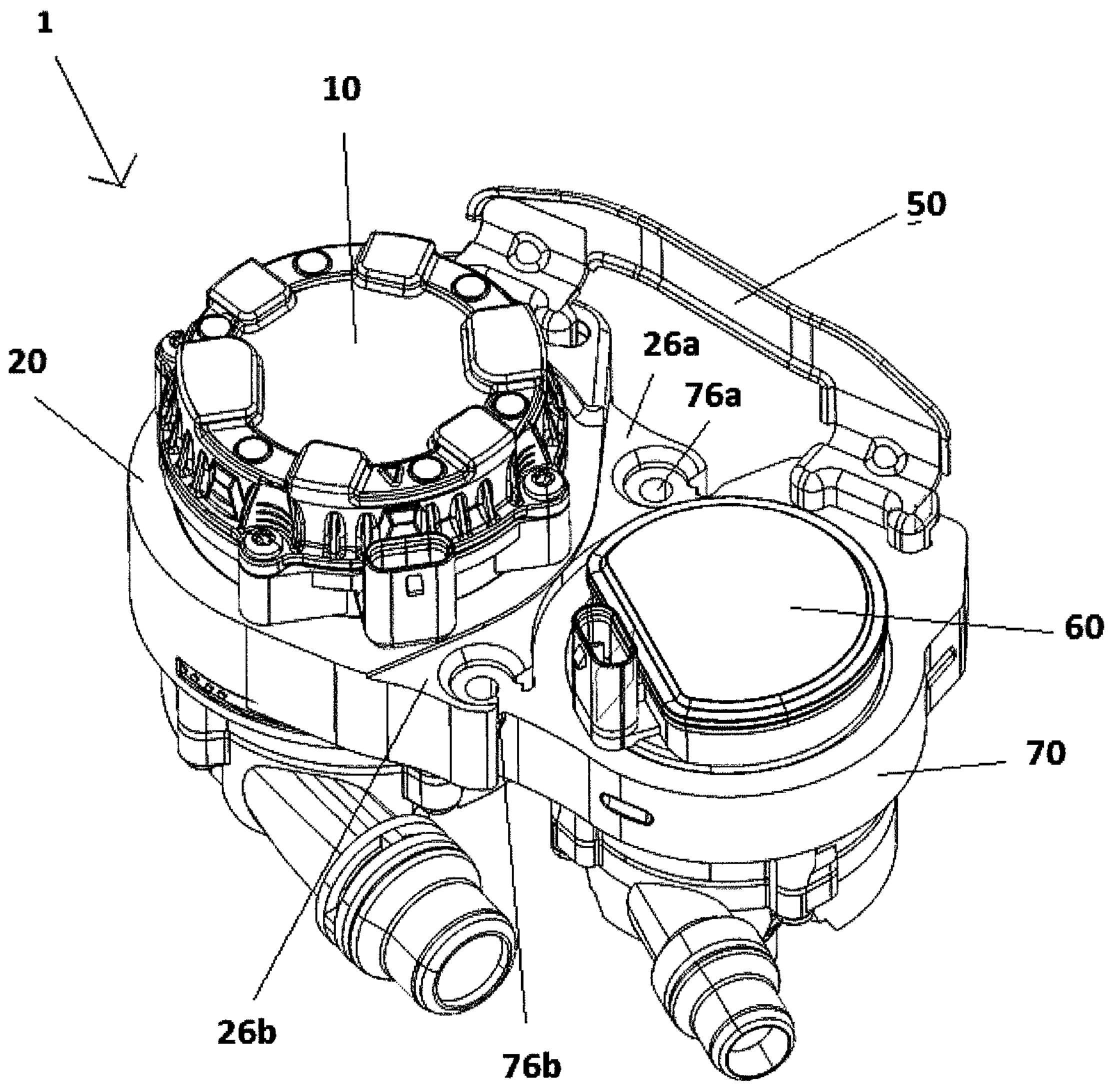
FIG. 7 shows an apparatus according to the invention comprising two holders connected to one another.

FIG. 7 illustrates an apparatus comprising a first holder 20 and a second holder 70 and a first fluid regulation unit 10 and a second fluid regulation unit 60. The holders 20 and 70 are connected to one another by means of four connecting elements 26*a*, 26*b*, 76*a*, 76*b*. Each holder 20, 70 has two connecting means, wherein each connecting means of a holder 20, 70 interacts with a connecting means 26, 76 of the other holder 20, 70. The first holder 20 and the second holder 70 are, after the mounting process, connected to one another in force-fitting and/or form-fitting fashion and/or fixedly by the connecting means 26, 76. The connecting means 26, 76 must in this case be designed such that vibrations resulting from the operation of the fluid regulation units 10, 60 or for example vibrations originating from the motor vehicle 5 or other components of the motor vehicle 5 do not lead to loosening of the connection of the connecting elements 26, 76 and thus to a separation of the holders 20, 70. This is realized by means of an embodiment according to the invention.

It is advantageous that the connection of the first holder 20 to the second holder 70 results in a minimization of the relative movements or vibrations of the fluid regulation devices 10, 60 with respect to one another. It is also advantageous that collision of the fluid regulation units 10, 60 can be avoided.

The holders 20, 70 have in particular an elastic and/or damping plastic, preferably an elastomer. The holders 20, 70 may furthermore have a plastic or metal inlay. The inlay is at least partially surrounded by, in particular insert-molded in, an elastomer. An inlay increases the stability of the holder 20, 70. The holders 20, 70 dampen mechanical oscillations, in particular vibrations. The holders 20, 70 minimize the transmission of movements, in particular vibrations, between the vehicle 5 and the fluid regulation device 10, 60. Furthermore, the holders prevent direct contact of the fluid regulation unit 10, 60 with the vehicle 5. Furthermore, on their surface, said holders have an increased friction coefficient which prevents the connecting elements 26 of the first holder 20 from being able to become separated, in particular of their own accord, from the connecting elements 76 of the second holder 70. Furthermore, the surface in particular in the receiving region 22 of the first holder 20 and in the receiving region 72 of the second holder 70 prevents slipping or displacement of the fluid regulation units 10, 60 relative to the holder 20, 70. The holders 20, 70 may have different materials with different hardnesses. In particular, through the use of materials, such as elastomers specifically adapted to the fluid regulation unit 10, 60, vibrations can be minimized. With the minimization of vibrations, it is also the case that disturbing noises are minimized. The first holder 20 at least partially has a different material, in particular a different material composition, than the second holder 70.

Figure 8:
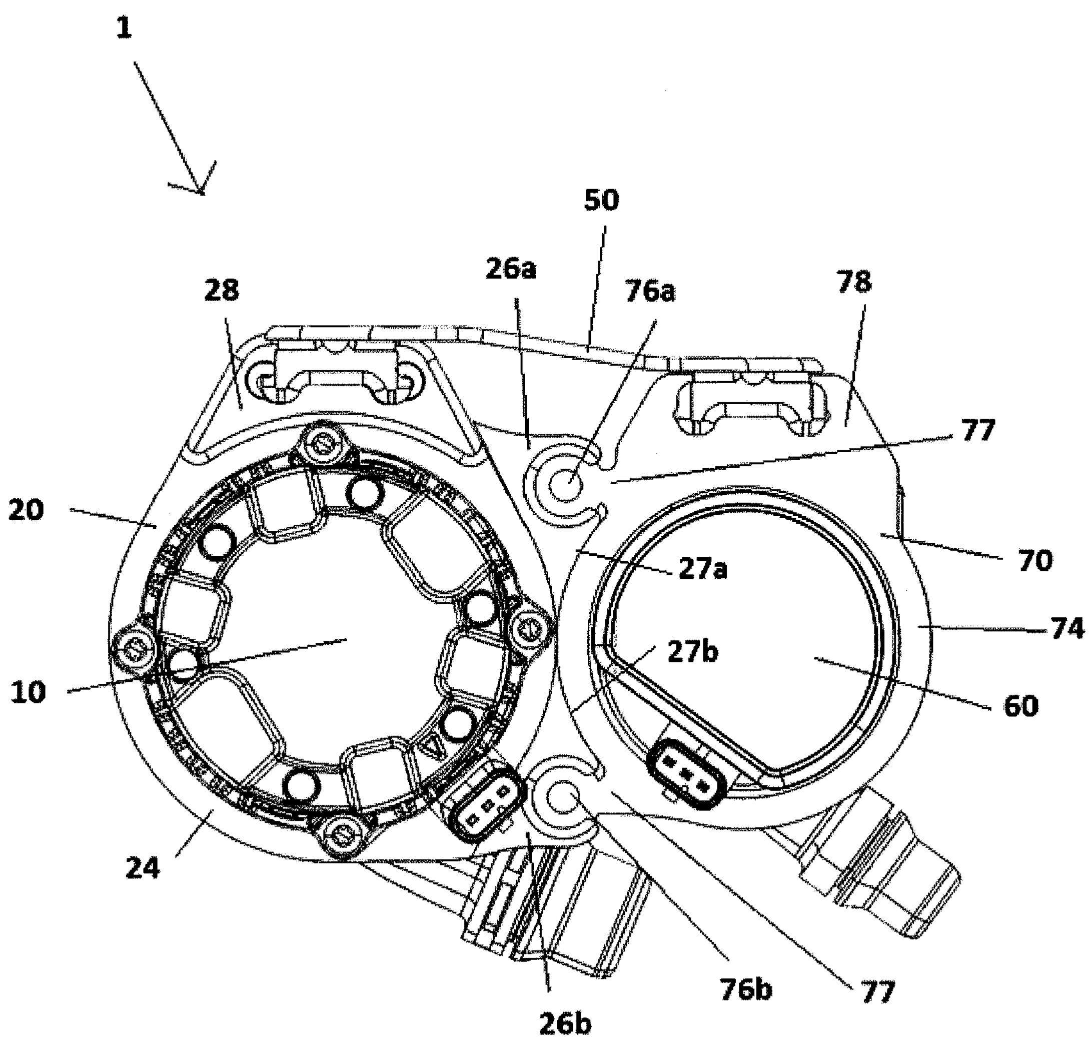
FIG. 8 shows a plan view of an apparatus according to the invention comprising two holders connected to one another.

In particular, the connecting element 26 is formed with the fastening cutout such that a concavely shaped region 27 is formed proceeding from the fastening cutout. The concavely shaped region 27 has the same radius as the outer radius of the other holder. The concavely shaped region 27 is formed on the outer circumference of the holder. A corresponding embodiment is illustrated in FIG. 8. The radially outer part of the second holder 70 bears against the connecting elements 26*a* and 26*b*. The connecting elements 26*a* and 26*b* are designed so as to correspond with the surface of the second holder 70. The region of the connecting elements 26 with a concavely shaped region 27*a*, 27*b* between the fastening cutouts makes contact with, or is connected to, the outer circumference of the second holder 70.

In one refinement of the invention, one of the holders 20, 70, in particular the first holder 20 or the second holder 70, has further connecting means 26, 76. The further connecting means 26, 76 allow a connection to an additional holder or to a further fluid regulation unit to be produced. The apparatus 1 can thus be expanded or supplemented to include any desired number of holders and thus also fluid regulation units.

In one refinement of the invention, the first holder 20 and the second holder 70 are of identical design aside from the different embodiment of the connecting elements 26, 76. Such an embodiment reduces production costs.

In one refinement, the holders 20, 70 may be of identical form. Here, the two holders 20, 70 have a fastening cutout and a fastening lug.

Figure 9:
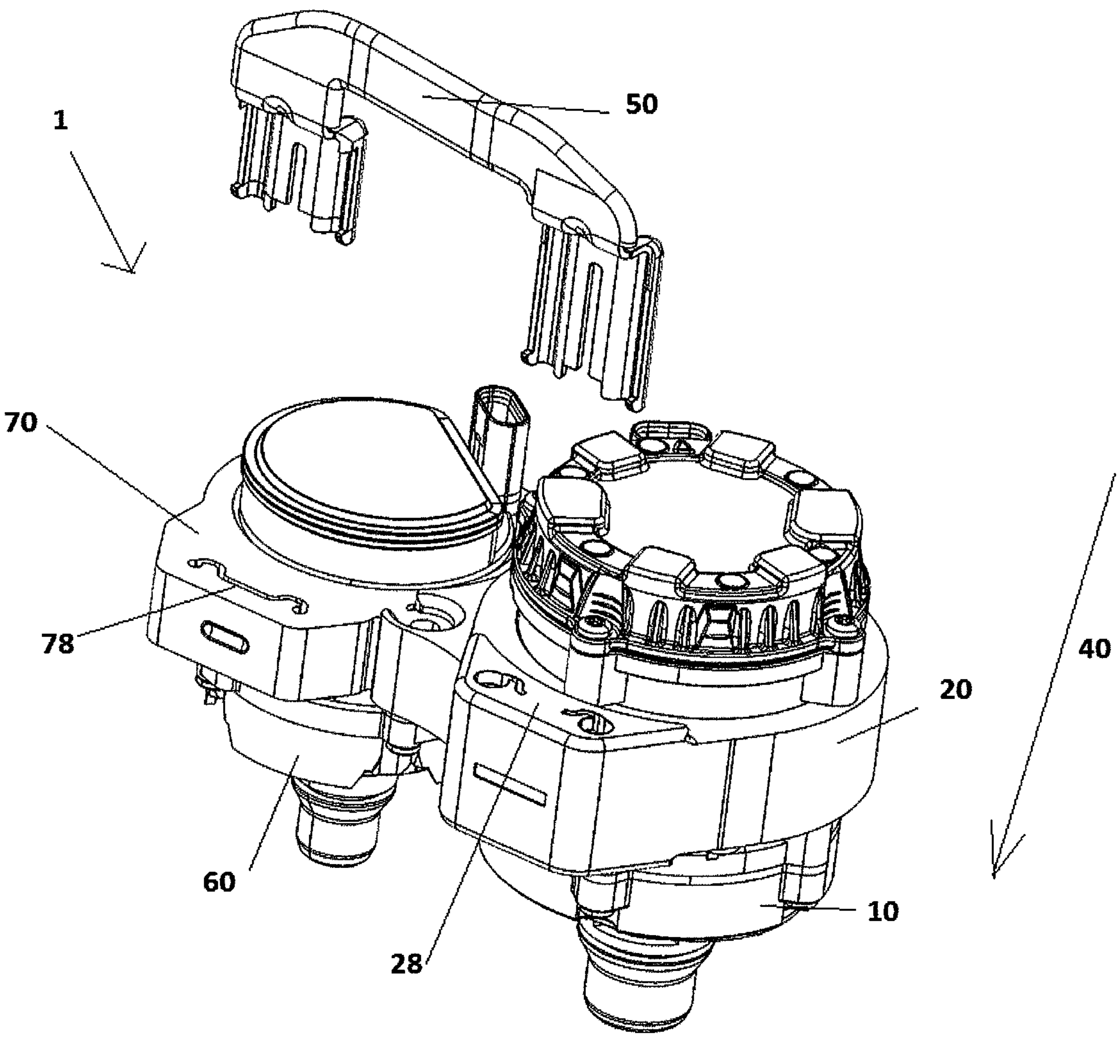
FIG. 9 is an illustration showing the mounting of a mounting device.
Figure 10:
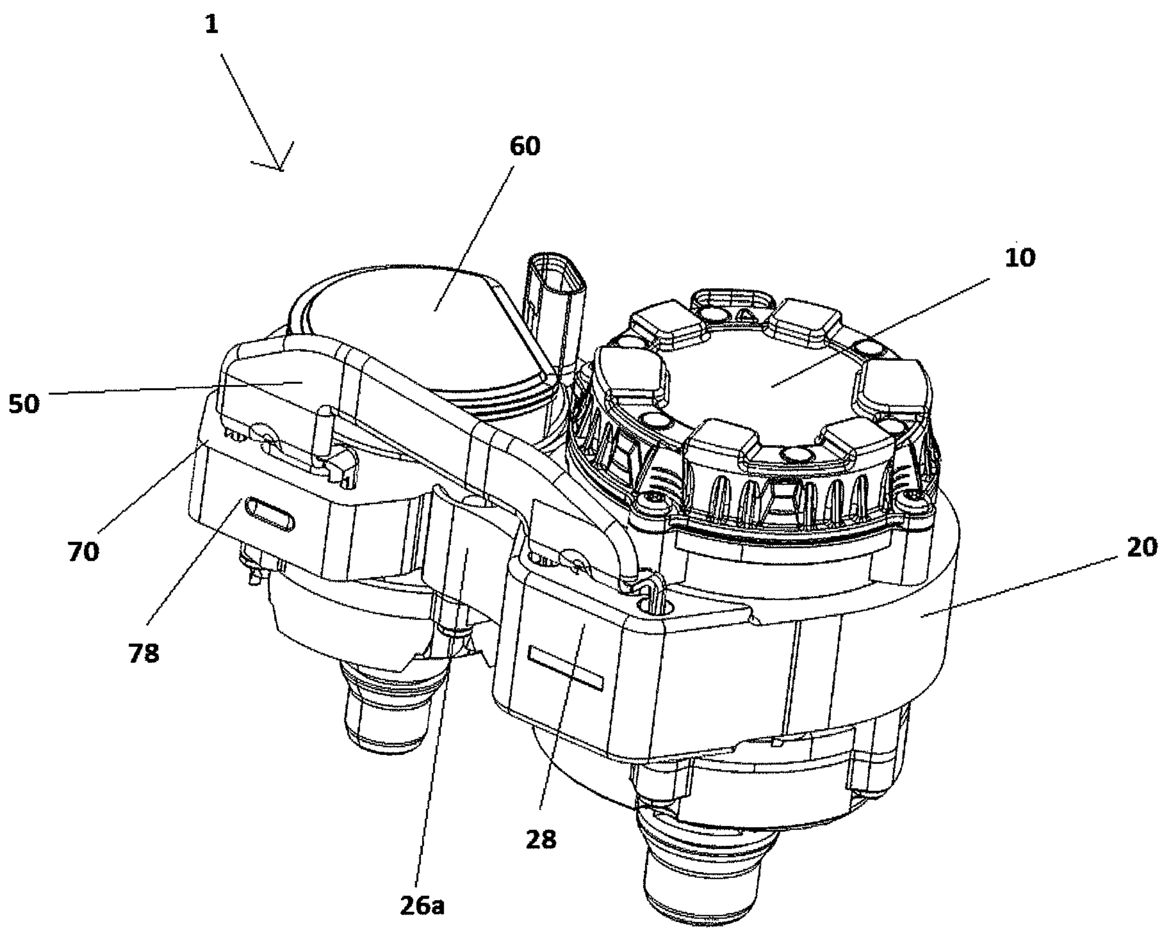
FIG. 10 shows an apparatus according to the invention in a perspective view.

FIG. 9 illustrates a further view of the apparatus 1 as per FIG. 7. Here, the view in FIG. 9 is directed toward the fastening means 28 of the first holder 20 and the fastening means 78 of the second holder 70. Furthermore, the mounting device 50 is shown in the upper region of the image. The mounting device 50 is a punched and bent part produced from a metal plate by means of a punching and bending process. The mounting device 50 is formed so as to correspond with the fastening means 28 of the first holder 20 and with the fastening means 78 of the second holder 70. The mounting device 50 is inserted in the mounting direction 40 into the fastening means 28 and 78, in particular into the recesses of the fastening means 28 and 78. In particular owing to the high friction of the elastomer that the first holder 20 and the second holder 70 have, the mounting device 40 is prevented from becoming detached from the fastening means 28 and/or 78. The mounting device 50 is, as illustrated in FIG. 10, connected to the holder 20 and in the holder 70 after the mounting process.

The mounting device 50 serves for producing a connection of the apparatus 1 to the vehicle 5. For this purpose, the mounting device 50 has a fastening element which is in particular specially adapted to the customer interface. In particular, fastening of the mounting device 50 to a vehicle 5 may be realized by means of joining, in particular screw connection, welding, adhesive bonding, plugging action, a clipping action, soldering etc.

It is advantageous that the mounting of the apparatus 1 can be performed fully automatically. It is also possible for the individual components of the apparatus 1 to be preassembled in any desired manner. Finally, such an apparatus 1 or parts of the apparatus 1 can be prefabricated on existing assembly lines.

The fluid regulation unit 10, 60 may be formed in particular as a pump, a valve, a combination of a pump and a valve, a fluid meter, in particular an apparatus for measuring the fluid throughflow or for measuring the composition of the fluid. Any desired combination is also possible. Furthermore, the fluid regulation unit 10, 60 may in particular take the form of electrical components which convert electrical energy into mechanical energy, for example mechanical motion, preferably of a pump, cooling circuit pump, valve, fan, additional electric motor or air-conditioning compressor or further device, which serve for providing a supply to and/or assisting a drive motor of a vehicle 5. The fluid regulation unit 10, 60 preferably regulates a fluid flow composed of a fluid. The fluid involves gases or liquids which, for example, circulate in the vehicle 5 and are used in particular for cooling a drive motor, in particular internal combustion engine or electric motor or hybrid motor. In particular, the fluid may take the form of cooling water, liquid metal, oil or alcohol.

In one refinement of the invention, the apparatus 1 is designed such that multiple fluid flows can be regulated separately or jointly. In particular, each fluid regulation unit 10, 60 can regulate at least one fluid flow. The fluid flows regulated by means of the first fluid regulation unit 10 and the fluid flows regulated by means of the second fluid regulation unit 60 may preferably be the same fluid flows. In one refinement of the invention, the fluid flow through the first holder 20 and the fluid flow through the second holder 70 are identical. In particular, the first fluid regulation device 10 may be in the form of a pump and the second fluid regulation device 60 may be in the form of a valve.

Regulating or regulation of a fluid flow is also to be understood to mean control, monitoring, shutting off or enabling of the fluid flow. Fluid flow in a vehicle is also to be understood to mean fluid flows of a vehicle.

A vehicle is in particular also to be understood to mean a motor vehicle, a passenger motor vehicle, a heavy goods vehicle, a train, a motorcycle, a bicycle, an aircraft and further transportation means, regardless of drive type, such as electric motor, internal combustion engine or hybrid motor.

What is claimed is:

1. An apparatus (1) for regulating at least one fluid flow in a vehicle (5), having:

- a first fluid regulation unit (20) for regulating a first fluid flow,
- a first holder (20) with a first receiving region (22) for the first fluid regulation unit (10) and with a first fastening means (28), wherein the first fluid regulation unit (10) is arranged in the first receiving region (22) of the first holder (20), and wherein the first fastening means (28) is provided for fastening the holder (20) to the vehicle (5),
- at least one second holder (70) with a second fluid regulation unit (60), wherein the second fluid regulation unit (60) is arranged in a second receiving region (72) of the second holder (70), and wherein the second holder (70) has at least one second connecting means (76) and a second fastening means (78), wherein the first holder (20) has at least one first connecting means (26) for connecting the first holder (20) to the at least one second connecting means (76) of the second holder (70), and
- a mounting device (50) that connects the first fastening means (28) and the second fastening means (78) to mount the first holder (20) and second holder (70) to the vehicle.

2. The apparatus (1) according to claim 1, wherein the first and second holders (20, 70) each have at least two connecting means (26*a*, 26*b*, 76*a*, 76*b*) which connect the holders (20, 70) to one another.

3. The apparatus (1) according to claim 1, wherein at least one connecting means (26*a*, 26*b*) of the first holder (20) and at least one connecting means (76*a*, 76*b*) of the second holder (70) form a plug-action connection or snap-action connection.

4. The apparatus (1) according to claim 1, wherein at least one of the connecting means (26*a*, 26*b*) of the first holder (20) has a fastening cutout, or is in the form of a fastening lug, and in that at least one of the connecting means (76*a*, 76*b*) of the second holder (70) has a fastening cutout, or is in the form of a fastening lug.

5. The apparatus (1) according to claim 4, wherein at least one fastening lug is of substantially cylindrical form, wherein the diameter of the fastening lug increases.

6. The apparatus (1) according to claim 4, wherein the fastening lug has a bore.

7. The apparatus (1) according to claim 4, wherein the fastening cutout is formed so as to correspond with a fastening lug.

8. The apparatus (1) according to claim 2, wherein the first holder (20) and/or the second holder (70) have/has a main body (24, 74), wherein the main body (24, 74) surrounds the receiving region (22, 72).

9. The apparatus (1) according to claim 4, wherein the fastening lug is, along its longitudinal axis, connected by means of a web (77) to the main body of the holder (20, 70).

10. The apparatus (1) according to claim 1, wherein at least one of the connecting means (26, 76) is formed radially at the outside on at least one of the holders (20, 70).

11. The apparatus (1) according to claim 1, wherein at least one of the holders (20, 70), at least partially, is formed from an elastomer or has an elastomer.

12. The apparatus (1) according to claim 1, wherein the apparatus (1) has three or more holders (20, 70), wherein at least one holder (20, 70) has at least one further connecting means (26, 76) for connecting to two or more holders (20, 70).

13. The apparatus (1) according to claim 1, wherein at least one connecting means (26_a_, 26_b_) of the first holder (20) and at least one connecting means (76_a_, 76_b_) of the second holder (70) form a plug-action connection or snap-action connection, wherein the mounting direction (40) of the plug-action connection or of the snap-action connection is translational or radial.

14. The apparatus (1) according to claim 1, wherein at least one of the connecting means (26_a_, 26_b_) of the first holder (20) has a fastening cutout with an undercut, or is in the form of a fastening lug, and in that at least one of the connecting means (76_a_, 76_b_) of the second holder (70) has a fastening cutout with an undercut, or is in the form of a fastening lug.

15. The apparatus (1) according to claim 4, wherein at least one fastening lug is of substantially cylindrical form, wherein the diameter of the fastening lug increases, wherein the at least one fastening lug has a cylindrical section and a frustoconical section, and wherein the cylindrical section and frustoconical section transition into one another and are formed in one piece.

16. The apparatus (1) according to claim 4, wherein the fastening lug has a continuous bore.

17. The apparatus (1) according to claim 4, wherein the fastening cutout is formed so as to correspond with a fastening lug, wherein the fastening cutout has a continuous groove running in a longitudinal direction of the fastening cutout.

18. The apparatus (1) according to claim 1, wherein the first holder (20) and/or the second holder (70) have/has a ring-shaped main body (24, 74), wherein the main body (24, 74) surrounds the receiving region (22, 72), wherein the first holder (20) and/or the second holder (70) act(s) with a uniform radial pressure on the fluid regulation unit (10, 60).

19. The apparatus (1) according to claim 1, wherein at least one of the holders (20, 70) is entirely formed from an elastomer or has an elastomer.

20. The apparatus (1) according to claim 1, wherein the apparatus (1) has a mounting device (50) for fastening the first holder (20) and the second holder (70) to a vehicle (5), and in that the mounting device (50) connects the fastening means (28, 78) at least of the first holder (20) and of the second holder (70).

* * * * *